United States Patent
Baker et al.

(10) Patent No.: US 11,861,701 B2
(45) Date of Patent: *Jan. 2, 2024

(54) SYSTEM, METHOD, AND TOOL FOR SYNTHETIC ORDER RECOVERY

(71) Applicant: TRADING TECHNOLOGIES INTERNATIONAL INC., Chicago, IL (US)

(72) Inventors: William Tigard Baker, Redmond, WA (US); Andrew Gottemoller, Chicago, IL (US); Filip Fracz, Naperville, IL (US)

(73) Assignee: Trading Technologies International, Inc., Chicago, IL (US)

( * ) Notice: Subject to any disclaimer, the term of this patent is extended or adjusted under 35 U.S.C. 154(b) by 285 days.

This patent is subject to a terminal disclaimer.

(21) Appl. No.: 17/121,368

(22) Filed: Dec. 14, 2020

(65) Prior Publication Data
US 2021/0125279 A1    Apr. 29, 2021

Related U.S. Application Data

(63) Continuation of application No. 14/852,877, filed on Sep. 14, 2015, now Pat. No. 10,896,464.
(Continued)

(51) Int. Cl.
*G06Q 40/04* (2012.01)
(52) U.S. Cl.
CPC ................... *G06Q 40/04* (2013.01)
(58) Field of Classification Search
CPC ...................................... G06Q 40/04
See application file for complete search history.

(56) References Cited

U.S. PATENT DOCUMENTS

| | | | |
|---|---|---|---|
| 7,113,924 B2* | 9/2006 | Fishbain | G06Q 40/06 705/37 |
| 8,775,294 B1* | 7/2014 | Keith | G06Q 40/04 705/37 |

(Continued)

FOREIGN PATENT DOCUMENTS

EP    1516252 B1    12/2008

OTHER PUBLICATIONS

How CQG Processes Synthetic Orders | Effective algorithmic trading solutions, CQG, May 2009.
(Continued)

*Primary Examiner* — Elda G Milef
(74) *Attorney, Agent, or Firm* — McDonnell Boehnen Hulbert & Berghoff LLP

(57) ABSTRACT

A tool for synthetic order recovery is provided. An exemplary method for synthetic order recovery includes the features for detecting a server event associated with a synthetic order server identified by a synthetic order server identifier, wherein the synthetic order server is in communication with the recovery tool; determining at least one active synthetic order associated with the synthetic order server identifier; determining a child order status for each child order related to the at least one active synthetic order, wherein the child order status includes an updated child order quantity since the server event was detected, and wherein each child order is associated with the synthetic order server identifier; calculating an updated synthetic order quantity for each of the at least one active synthetic order and based on the updated child order quantity; generating a recovery package including the at least one active synthetic order and the updated synthetic order quantity; and communicating the recovery package to the synthetic order server associated with the synthetic order server identifier.

18 Claims, 8 Drawing Sheets

Related U.S. Application Data

(60) Provisional application No. 62/052,658, filed on Sep. 19, 2014.

(56) References Cited

U.S. PATENT DOCUMENTS

| | | | |
|---|---|---|---|
| 2007/0180302 A1 | 8/2007 | Allen et al. | |
| 2011/0087582 A1* | 4/2011 | Pak | G06Q 40/04 |
| | | | 705/37 |
| 2011/0145124 A1 | 6/2011 | Rooney | |
| 2011/0251942 A1* | 10/2011 | Rosenthal | G06Q 40/04 |
| | | | 705/37 |
| 2012/0011391 A1 | 1/2012 | Callaway | |
| 2012/0016784 A1* | 1/2012 | Mintz | G06Q 40/04 |
| | | | 705/37 |
| 2012/0130882 A1* | 5/2012 | Smith | G06Q 40/04 |
| | | | 705/37 |
| 2015/0073967 A1* | 3/2015 | Katsuyama | G06Q 30/08 |
| | | | 705/37 |
| 2016/0086272 A1 | 3/2016 | Baker et al. | |

OTHER PUBLICATIONS

CQG Order Types Supported by Exchange, CQG, Nov. 4, 2009.
X Trader® Version 7.12.X User Manual, Trading Technologies, dated Mar. 5, 2014.

* cited by examiner

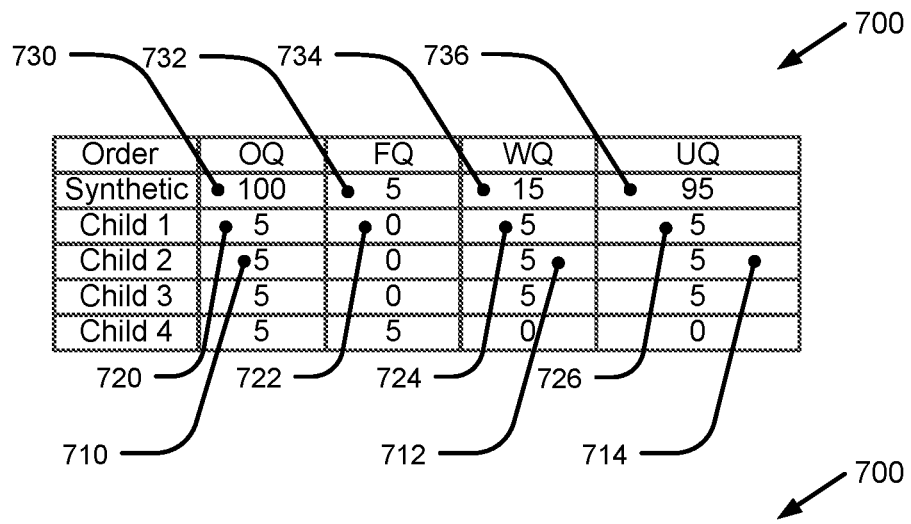
FIG. 7A
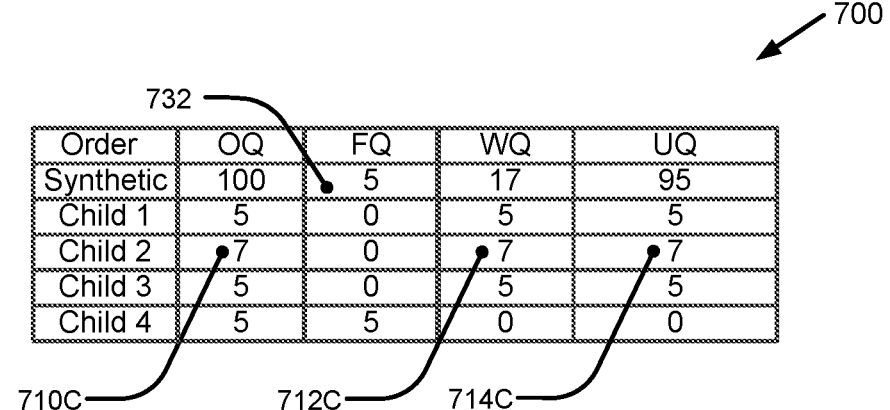
FIG. 7B
FIG. 7C
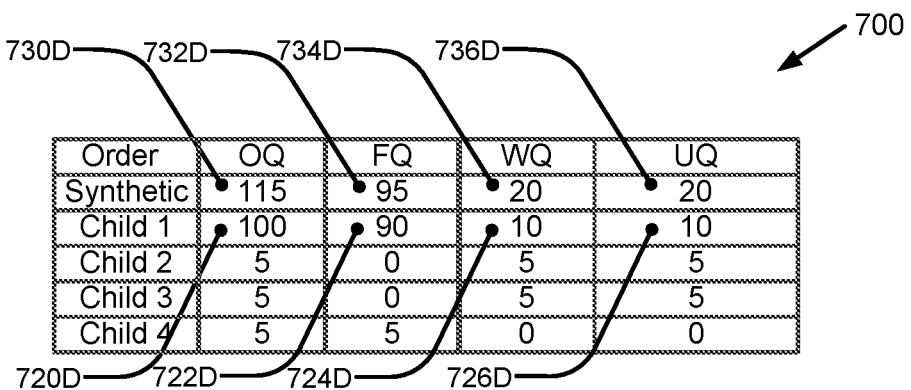
FIG. 7D

SYSTEM, METHOD, AND TOOL FOR SYNTHETIC ORDER RECOVERY

CROSS-REFERENCE TO RELATED APPLICATIONS

The present application is a continuation of U.S. patent application Ser. No. 14/852,877, filed Sep. 14, 2015, now U.S. Pat. No. 10,896,464, which claims the benefit of U.S. Provisional Application Ser. No. 62/052,658, entitled "Synthetic Order Recovery," filed Sep. 19, 2014, the entire contents of each of which are incorporated herein by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

A synthetic order may be processed by the trading device. At some point, while the synthetic order is still active, the trading device may be restarted, for example due to maintenance or a failure, and the synthetic order may need to be recovered.

BRIEF DESCRIPTION OF THE FIGURES

Certain embodiments are disclosed with reference to the following drawings.

FIGS. 7A-7D illustrate a synthetic order and alternate examples of what may have occurred while the server running the synthetic order was unavailable.

Figure 1:
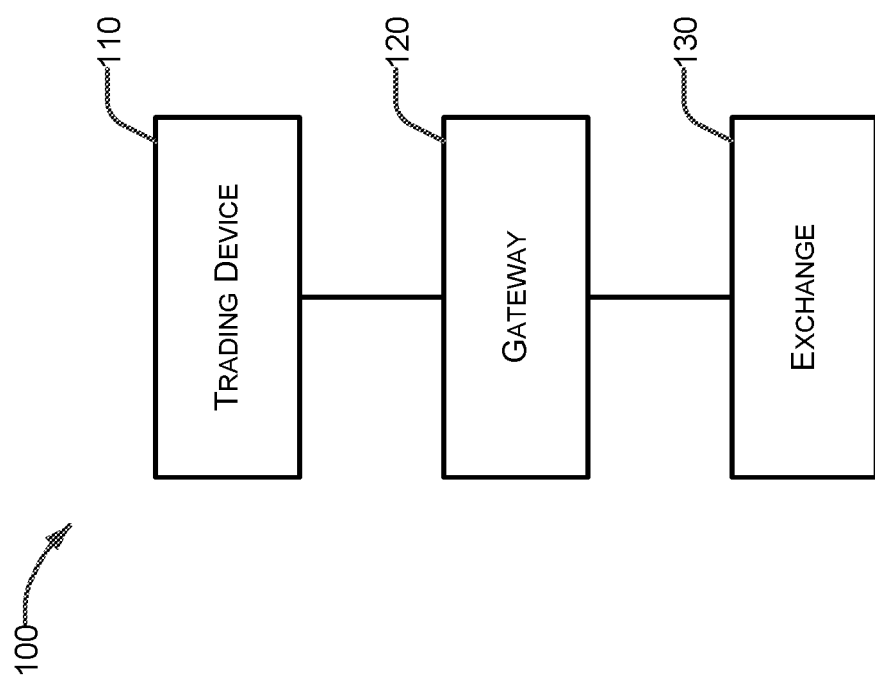
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This patent document generally relates to order management, and more particularly to a system, method, and tool to implement and manage a synthetic order recovery process.

Synthetic orders may be generated using tools such as X_TRADER, ADL®, and/or TTSDK™ provided by Trading Technologies International, Inc. of Chicago, Illinois ("Trading Technologies"). Synthetic orders may be generated in response to a trader's action and/or by an automated trading tool, for example. A synthetic order includes an order type, and may be referred to as a parent order that is, in turn, associated with one or more child orders. Order types for a synthetic order include, for example, a Stop order type, an If Touched order type, a Trailing Stop order type, an Iceberg order type, a Time Slicer order type, a Volume Slicer order type, and a Custom Logic order type. Custom Logic order types associated with a synthetic order includes a set of user-defined rules that control the operation of the synthetic order. The behavior of a synthetic order of a particular order type is specified in a definition for the synthetic order type. Synthetic orders identified and defined as parent orders specify and include child orders to be placed at the exchange based on the definition associated with the order type and the definition of the synthetic order.

In certain embodiments, a synthetic order server may be configured to generate child orders based on a received definition for a synthetic order. In operation, the synthetic order server manages and monitors multiple synthetic orders of various order types and the defined interactions with an exchange. For example, the synthetic order server may manage and monitor the timing, size, and other user-defined parameters associated with child orders specified as part of the received definition. At some point, while the synthetic order is still active and working in the market, the synthetic order server may shutdown and have to be restarted, for example due to maintenance or a failure, and the synthetic order may need to be recovered. In some examples, a synthetic order server may need to be replaced with another synthetic order server (for example, due to catastrophic hardware failure or due to loss of network connectivity). A synthetic order recovery involves accounting for synthetic order actions, such as changes and fills, that occur while the synthetic order server was unavailable. For example, a synthetic order defined as a parent order and having one or more child orders that may have been filled while the synthetic order server was unavailable. In this example, the recovery process identifies, accounts for, and updates the synthetic order server of the change resulting from the filled child order.

In certain embodiments, the synthetic order server may need to manage and monitor a synthetic order for prolonged periods of time. For example, a synthetic order may be scheduled to run for several weeks. In cases where the synthetic order server processing the synthetic order crashes or needs to be restarted for an upgrade, for example, the synthetic order being processed by the synthetic order server will need to be recovered. The recovery process accounts for changes and fills that occur to the child orders while the synthetic order server is unavailable.

As part of the synthetic order recovery, changes to the child orders associated with the synthetic order that occurred while the synthetic order server was unavailable, need to be taken into account. For example, fills related to the child orders associated with the synthetic order need to be accounted for. While the synthetic order server restarts, and is therefore unavailable, a child order of a synthetic order managed by the now-unavailable synthetic order server may be filled, for example. Upon restarting the synthetic order server, an exemplary synthetic order recovery process executes and reconciles the filled order that occurred while the synthetic order server was unavailable. Additionally, the now-updated synthetic order server may broadcast or otherwise communicate one or more updates or synthetic fills to one or more clients.

Traditionally, the recovery process included downloading orders and fills and reconciling them with data previously written to a journal file residing on the synthetic order server. Journal files are created, updated, and maintained as the synthetic order server operates which is a process that negatively impacts performance, limits recovery options, and is subject to race conditions that could prevent successful recovery. The strategy of using a journal file required, for example, writing every synthetic order and order message to disk. These operations resulted in a bottleneck for all threads on the synthetic order server that were sending or receiving child orders or sending updates for synthetic orders. With many synthetic order servers having only one disk, and with writes needed to succeed prior to proceeding, only one thread could proceed at a time whenever writing to the journal file was required. Journal files constantly grow (as new records are written) and so the traditional journal file approach also required daily file cleanup to prevent the file from growing too large. Another shortfall to using a journal is that there are race conditions that can prevent proper recovery. If the synthetic order server processing the synthetic order crashed before the information was written to the journal file (or conversely, wrote an action to the journal file and then crash prior to taking the action), the information in the journal file would not have complete and accurate information. This could result in errors such as double counting fill quantities or overfilling a synthetic order by placing too many child orders after recovery. Storing the information in a journal file makes it difficult to migrate as the journal file can only be read by and written to a single synthetic order server. Additionally, in many server configurations the journal file must reside on the same physical machine as the server process.

The disclosed and described embodiments of the synthetic order recovery tool provide a mechanism by which a synthetic order may be recovered in the event that the synthetic order server becomes unavailable, without the shortcomings of using a journal file. For example, if the synthetic order server crashes while processing a synthetic order (or paused, or held, or otherwise managed by the server), the synthetic order recovery tool downloads the synthetic orders managed by the synthetic order server prior to the crash and reconcile them with changes that occurred while the synthetic order server was unavailable.

The synthetic order recovery eliminates the need for a journal file and make it easier to rectify downloaded orders and fills.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

This patent document relates to a system, method, and tool for synthetic order recovery. In certain embodiments, an exemplary method includes detecting a server event associated with a synthetic order server identified by a synthetic order server identifier, wherein the synthetic order server is in communication with the recovery tool; determining at least one active synthetic order associated with the synthetic order server identifier; determining a child order status for each child order related to the at least one active synthetic order, wherein the child order status includes an updated child order quantity since the server event was detected, and wherein each child order is associated with the synthetic order server identifier; calculating an updated synthetic order quantity for each of the at least one active synthetic order and based on the updated child order quantity; generating a recovery package including the at least one active synthetic order and the updated synthetic order quantity; and communicating the recovery package to the synthetic order server associated with the synthetic order server identifier.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
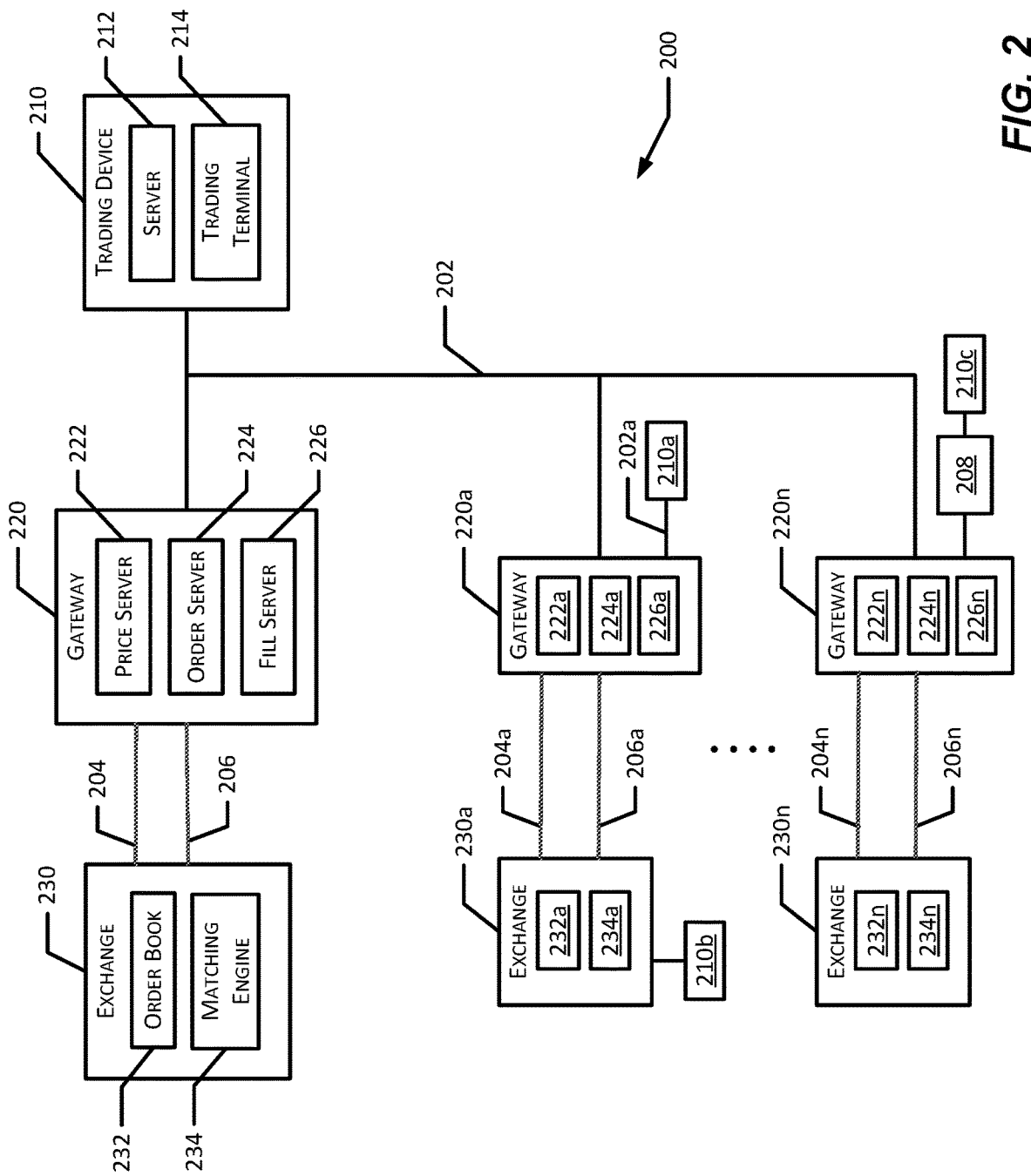
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
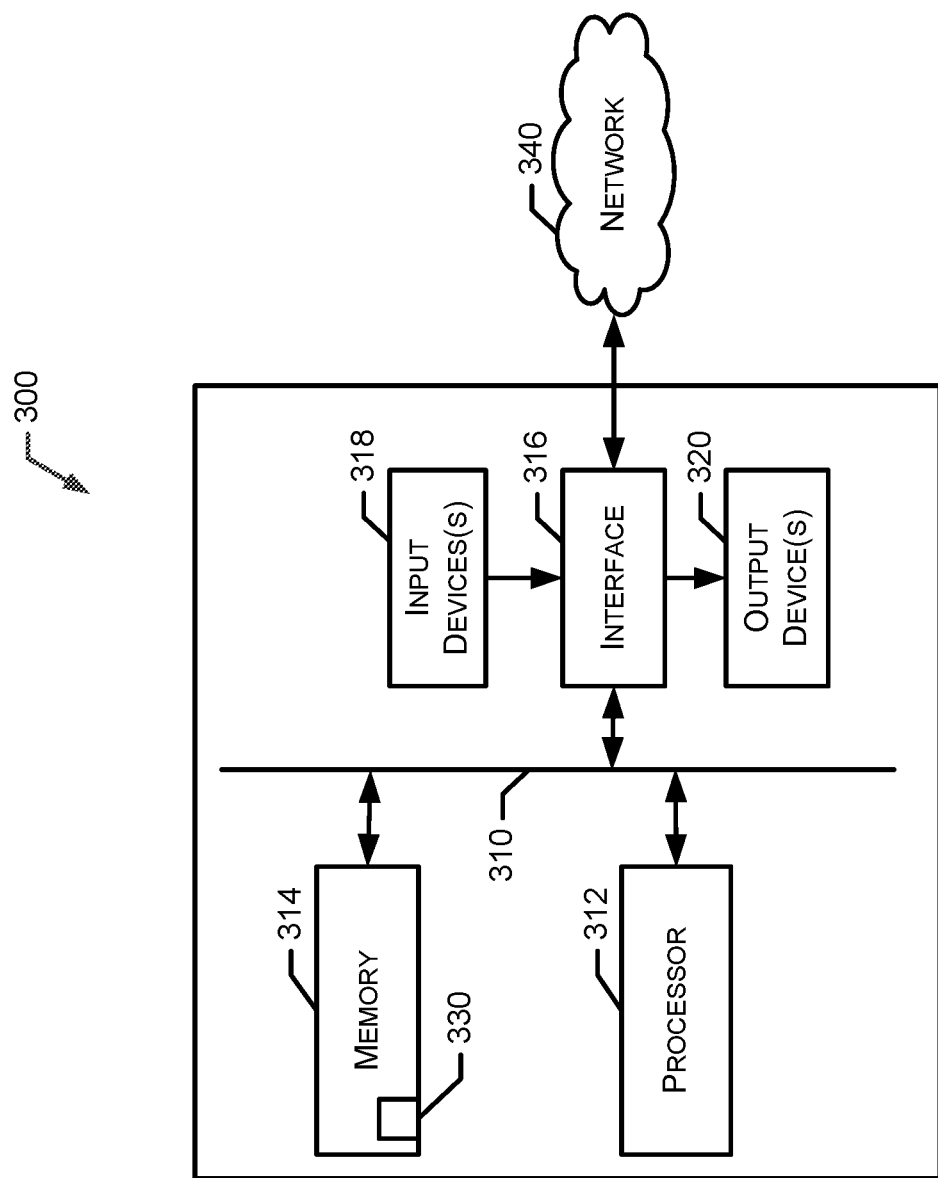
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Synthetic Order Recovery Tool and Method

Figure 4:
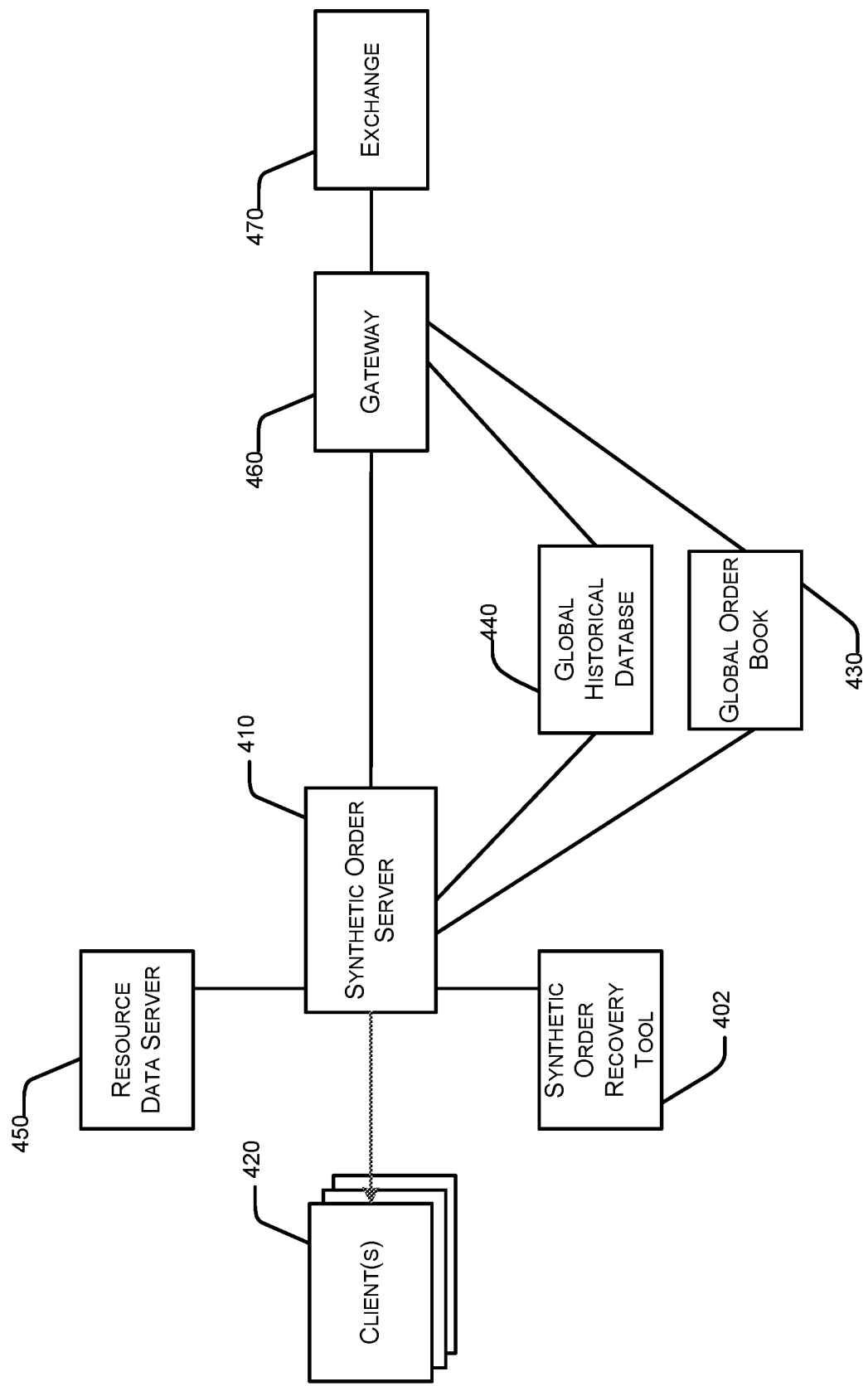
FIG. 4 illustrates a block diagram representative of an example synthetic order recovery system in which certain embodiments may be employed.

FIG. 4 illustrates a system 400 for recovery of a synthetic order in accordance with certain embodiments. The system 400 includes a synthetic order recovery tool 402, a synthetic order server 410, clients 420, a global order book 430, a global historical database 440, a resource data server 450, a gateway 460, and an exchange 470.

The individual devices in the system 400 communicate with the exchange 470 through, for example, the gateway 460. As depicted in FIG. 4, the synthetic order server 410 is arranged and configured to communicate with clients 420, global order book 430, global historical database 440, resource data server 450, and gateway 460. Global order book 430 and global historical database 440 may be in communication with gateway 460. The exemplary system 400 depicted in FIG. 4 may be in communication with additional components, subsystems, and elements to provide additional functionality and capabilities without departing from the teaching and disclosure provided herein. For example, in certain exemplary embodiments, the global order book 430 and the global historical database 440 may be implemented together in a single unified database and/or device.

Synthetic order recovery tool 402 (hereinafter referred to as the recovery tool 402) is coupled to and/or communicates with the synthetic order server 410. In operation. The recovery tool 402 is configured to detect operating status of the order server 410. In certain embodiments, the recovery tool 402 operates as a separate device in communication with the synthetic order server 410, as depicted in FIG. 4. For example, the memory and operating instructions utilized by the recovery tool 402 may be implemented as a custom network interface card (NIC). The custom network interface card may, for example, utilize specialized firmware that provides network interface functionality while allowing the recovery tool 402 to monitor the status of the synthetic order server 410. In another example, the recovery tool 402 may be a standalone or peripheral device configured to interface and communicate information with synthetic order server 410. In certain embodiments, the recovery tool 402 may be implemented as a software subroutine or module that operates as a part of the synthetic order server 410. In certain embodiments, the recovery tool 402 may monitor multiple instance of the synthetic order server.

Synthetic order server 410 manages and directs the processing of synthetic orders. For example, synthetic order server 410 may receive a synthetic order from the client 420 or another synthetic order server. Processing of a synthetic order includes, for example, generating, requoting, cancelling, sending, and/or managing one or more child orders of the synthetic order. The processing may include the synthetic order server 410 communicating with the exchange 470 via the gateway 460 by, for example, sending messages to place, requote, and/or cancel orders. In addition, the processing may include synthetic order server 410 receiving messages from the exchange, such as fill and/or confirmation messages.

The synthetic order server 410 is uniquely identified with a synthetic order server identifier. The synthetic order server identifier allows other components of the system 400 to uniquely identify and address messages and/or commands to the synthetic order server 410. Once the synthetic order server 410 receives a synthetic order, it assigns a unique synthetic order identifier to the received synthetic order. In other embodiments, the synthetic order identifier may be provided to the synthetic order server 410 with the synthetic order (for example, the synthetic order identifier may be generated when the synthetic order is created). As the synthetic order server 410 processes a synthetic order, it may communicate data related to the synthetic order, along with the synthetic order identifier and/or the synthetic order server identifier to other devices of the system 400, such as the global order book 430 and the resource data server 450.

Client 420 provides and/or receives information regarding a synthetic order from the synthetic order server 410. Client 420 may include a trading device, an algorithmic trading system, or a server, for example. For example, client 420 may send a synthetic order to the synthetic order server 410 to be processed. The synthetic order server 410 may in turn provide the client 420 with updated status information (for example, fills, price changes, and/or quantity changes) about the synthetic order as it is processed. It should be understood that more than one client can be in communication with synthetic order server 410.

Global order book 430 contains all active synthetic orders in the trading system. Each active synthetic order in the global order book is identified with a unique synthetic order identifier being used by the synthetic order server 410. In addition, each active synthetic order is associated with a synthetic order server identifier which identifies the particular synthetic order server processing the synthetic order. An active synthetic order is any synthetic order whose processing is not completed. For example, a time slicer order which is only half way through its duration is an active synthetic order. In contrast, a synthetic order that has been completely filled or cancelled would not be an active order. Data related to a synthetic order stored in global order book 430 may include, for example, a tradeable object associated with the synthetic order, order quantity, filled quantity, unfilled quantity, account, user parameters, or and any other data associated with the synthetic order. Global order book 430 may update the data related to the synthetic order based on updates provided by synthetic server 410.

Global historical database 440 contains historical data related to all orders working for the system, as well as the historical data related to all working and previously working orders in the system. The historical data may include order fill records, order update records, order delete records, and/or other data for all orders for the system. Global historical database 440 includes the most recent status for child orders of a synthetic order. The global historical database 440 may receive a query for the status of child orders related to a synthetic order. The queries may be received from various devices of the system 400, such as the synthetic order server 410 when the server 410 is restarted, for example. The query may include a synthetic order identifier that can be then used by the global historical database 410 to search for all child orders associated with the corresponding synthetic order.

Resource data server 450 stores synthetic order logic components for different order types. In this example, the synthetic order server provides a synthetic order type identifier to the resource data server. The resource data server retrieves and provides the synthetic order logic component associated with the synthetic order type identifier. The synthetic order logic component may include a number of components, such as, for example, a time monitor component, an active logic component, a communicator, a child order manager, a price monitor component. For example, a time slicer order type may utilize time-based triggers to determine when a child order should be sent to the market. In the present example, the synthetic order logic for a time slicer order type may include a time monitor component that monitors elapsed time and generates time-based order entry triggers. In another example, a volume slicer order type may utilize quantity-based triggers to determine when a sufficient volume of trading has occurred to warrant sending a child order to the market. The active logic component may be configured to manage active synthetic orders based on rules encoded using conditional and/or Boolean logic, for example. The communicator may be configured to communicate with global historical database 440 or global order book 430, or other devices in the system. The child order manager may be configured to track which child orders are still active. The price monitor may monitor price data being received from an electronic exchange. Each synthetic order logic component may receive all data recovered for the corresponding synthetic order to restart processing of the synthetic order.

While FIG. 4 illustrates one example embodiment of the system 400, it should be understood that various other configurations could be used as well. For example, functionality of resource data server 450 may be performed by components of synthetic order server 410 and/or the recovery tool 402. In another embodiment, functionality of synthetic order server 410 may be performed by components of client 420.

In operation, upon detection of change in server state in response to the start or initialization of the synthetic order server 410, the recover manager and/or the recovery tool 402 may initiate a synthetic order recovery process. Changes in server state may be a flag or heartbeat indicating a server event. Server events are any condition or set of conditions that result in a server, e.g., the synthetic order server 410, being unavailable. An example of a server event that results in an unavailable server is a shutdown or disconnection of the synthetic order server 410 from the system 400. Other example server events include a server upgrade, a server crash, a scheduled or user-initiated restart, and/or a hardware failure. Next, the recovery tool 402 retrieves a synthetic order server identifier for the synthetic order server 410 identified by the server event. The synthetic order server identifier may be retrieved from an internal configuration file maintained at the recovery tool 402. Alternatively or in addition to, the recovery tool may receive the synthetic order server identifier as part of the server event. For example, the synthetic order server identifier may be communicated as a heartbeat between the synthetic order server 410 and the recovery tool 402. The interruption of the example heartbeat identifies both the occurrence of a server event, and the particular synthetic order server experiencing the server event. In another embodiment, a control server can be configured to store synthetic order server identifiers for different synthetic order servers. The recovery tool 402 may then download active synthetic order data from global order book 430 by sending a request including the retrieved synthetic order server identifier to global order book 430.

In operation, global order book 430 may provide active synthetic orders corresponding to the received synthetic order server identifier to the recovery tool 402 upon receiving a request from recovery tool 402 and/or the synthetic order server 410. The synthetic orders provided by the global order book 430 may include synthetic order identifiers. Alternatively, in response to a detected server event, the global order book 430 may implement recovery logic provided by the recovery tool 402 and communicate all active synthetic orders corresponding to a synthetic order server identifier to the recovery tool 402.

The recovery tool 402 may also query global historical database 440 to receive the last status for child orders for each active synthetic order. The recovery tool 402 may provide the synthetic order identifiers for the active synthetic orders provided by the global order book 430 to global historical database 440. The recovery tool 402 may maintain a list of synthetic order identifiers for the active orders working at the synthetic order server 410. Alternatively, in response to a detected server event, the global historical database 440 may implement recovery logic provided by the recovery tool 402 and communicate the last status for child orders for each active synthetic to the recovery tool 402.

In operation, global historical database 440 may use the provided synthetic order identifiers to search for child orders associated with the corresponding synthetic orders. Global historical database 440 may then retrieve and provide the most recent status for the child orders associated with the provided synthetic order identifiers to the recovery tool 402.

Once the child order data is provided by global historical database 440, the recovery tool 402 may update the status of each synthetic order in its database to indicate that one or more synthetic orders are being recovered and that the recovery process has started. The recovery tool 402 may communicate the status information to client 420 directly. In certain embodiments, the recovery tool 402 may communicate the status information to the synthetic order server 410 that, in turn, communicates the status to the client 420.

In operation, the recovery tool 402 may also retrieve synthetic order logic components corresponding to one or more recovered synthetic order identifiers. The synthetic order logic components to be retrieved may be determined based on synthetic order type identifiers associated with the synthetic orders. A synthetic order component provides the functionality to implement a particular type of synthetic order. The recovery tool 402 may retrieve the synthetic order logic from a local file or from resource data server 450, for example.

In operation, upon receiving a synthetic order type identifier in the request from the recovery tool 402, resource data server 450 may retrieve the corresponding synthetic order logic component and provide it to the recovery tool 402.

Based on the received information, the recovery tool 402 may execute synthetic order recovery logic. Example control routines for recovering a synthetic order is described below with respect to FIGS. 5, 6, 7A to 7D, and 8. Executing the synthetic order recovery logic may involve updating synthetic order quantity based on the last status of the child orders and sending the updated synthetic order quantity to client 420. In operation, using the information related to child orders provided by global historical order book 440, the recovery tool 402 can determine if any child order changes occurred during the time when the server was not running. The changes to child orders may include, for example, changing a child order's quantity or price, deleting child orders, filling child orders, placing child orders on hold, and placing one or more child order orders at an electronic exchange. Using the data related to the changes of child orders, the recovery tool 402 updates the status and quantities of the synthetic order. For example, if child order fills are detected, the recovery tool may update the synthetic order's total quantity, filled quantity, working quantity. It should be understood that depending on the type of a synthetic order different types of order quantities associated with the synthetic order may be updated as well.

Executing the synthetic order recovery logic at the recovery tool 402 may also include sending any new child order fill data based on the child order data received from global historical database 440, checking for any additional conditions for recovery. The additional conditions may include actions to be performed in relation to active child orders or the corresponding synthetic order, such as, for example, modification of an order price related to the child order. Based on the overall status of the synthetic order, synthetic order manager may determine an appropriate method for resuming operation of the synthetic order.

Figure 5:
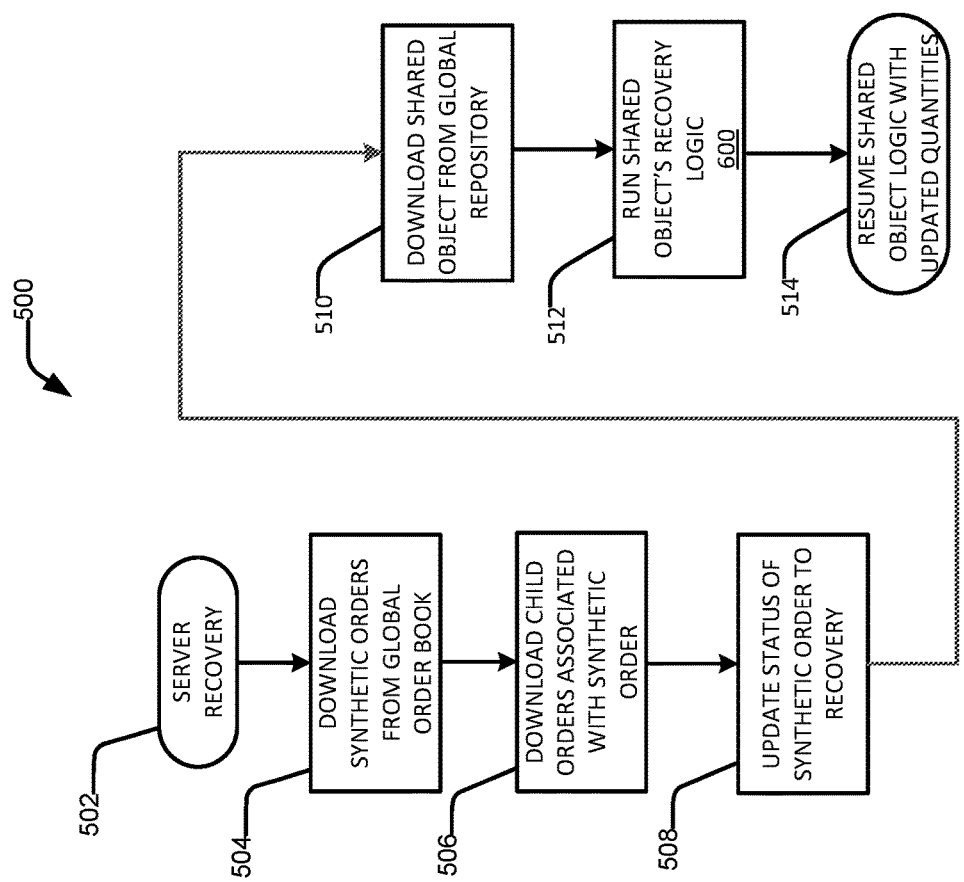
FIG. 5 illustrates a flow diagram of exemplary processes executed to perform the synthetic order recovery.

FIG. 5 illustrates an exemplary control routine 500 to recover one or more active synthetic orders in accordance with certain embodiments.

At block 502, the control routine 500 is executed by the synthetic order recovery tool after detecting a server event indicating that the synthetic order server has restarted. The server event may be initiated upon determination that the synthetic order server has restarted after an upgrade, a crash, a scheduled restart, a user initiated restart, or hardware failure, for example.

The recovery tool retrieves a synthetic order server identifier. The recovery tool may retrieve the synthetic order server identifier from an internal configuration file maintained and updated at the recovery tool. In certain embodiments, the recovery tool may retrieve the synthetic order server identifier from a control server, for example. In certain embodiments, the recovery tool 402 may prompt a user or administrator to provide or identify a synthetic order server in order to manually start the recovery process.

At block 504, the control routine 500 downloads active synthetic orders from a global order book. The recovery tool provides the synthetic order server identifier to the global order book. The global order book retrieves and provides the active synthetic orders associated with the synthetic order server identifier to the recovery tool. An active synthetic order is any synthetic order whose processing is not completed. For example, a time slicer order which is only half way through its duration is an active synthetic order. In contrast, a synthetic order that has been completely filled or cancelled would not be an active order.

At block 506, the control routine 500 downloads the last status for child orders for each active synthetic order from a global historical database. The synthetic orders downloaded at block 504 each include a synthetic order identifier. The recovery tool provides the synthetic order identifier to the global historical database. The global historical database retrieves and provides the most recent status for the child orders associated with provided synthetic order identifiers to the synthetic order server.

At block 508, the control routine 500 updates the status of the synthetic order at the recovery tool to indicate that the synthetic order is being recovered. That is, that the recovery process has started. In another embodiment, the recovery tool and control routine 500 may communicate the updated status to the synthetic order server as the recovery process commences.

At block 510, the control routine 500 retrieves the synthetic order logic component. The synthetic order includes a synthetic order type identifier. The synthetic order logic component provides the functionality to implement the synthetic order. The synthetic order logic component may be retrieved from a local file, such as a dynamic link library (DLL) or shared object, for example. As another example, the synthetic order logic component may be retrieved from a resource data server that stores synthetic order logic components for different order types. In this example, the synthetic order server provides the synthetic order type identifier to the resource data server. The resource data server retrieves and provides the synthetic order logic component associated with the synthetic order type identifier.

At block 512, the control routine 500 executes a recovery manager component included in the synthetic order logic component. The recovery manager component provides the specific functionality to recover a particular synthetic order type.

Figure 6:
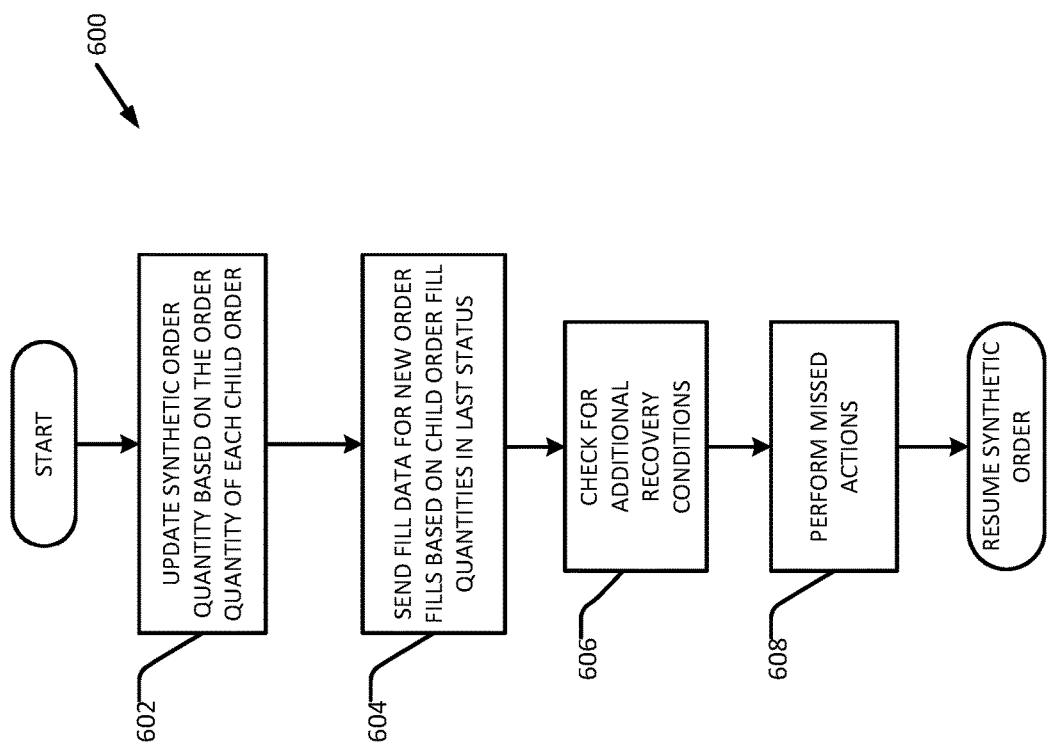
FIG. 6 illustrates a flow diagram of an exemplary synthetic order recovery logic component.

FIG. 6 illustrates an exemplary control routine 600 for a recovery manager component for a slicer type synthetic order that may be implemented by the recovery tool as part of an exemplary recovery process. The recovery manager component may be stored in the synthetic order logic component. The synthetic order logic component is retrieved from the resource data server.

At block 602, the control routine 600 updates the order quantity of the synthetic order based on the child order quantities in the last status. The child order quantities are provided to the recovery manager component. The recovery manager component determines an updated order quantity for the synthetic order from the child order quantities. For example, the updated order quantity of the synthetic order may be equal to the sum of the order quantities of the child orders.

At block 604, the control routine 600 sends recovered fill data to the client to reflect the quantity filled for child orders of the synthetic order while the synthetic order server was unavailable. The child order quantities are provided to the recovery manager component. The recovery manager component determines the quantity filled for the synthetic order from the filled order quantities corresponding to the child orders of the synthetic order. For example, the recovery fill order quantity may be equal to the sum of the child order filled quantity minus the synthetic order filled quantity before the synthetic order server was restarted.

At block 606, the control routine 600 determines if additional recovery conditions apply. For example, for time slicer type synthetic orders, the control routine may determine if any scheduled child orders were not sent to the exchange at their scheduled time. In another example, for duration type synthetic orders, the control routine may determine if the duration of the synthetic order has expired. Another recovery condition could result in the cancellation of a synthetic order if a related child order is determined to have been canceled prior to submission. For example, if a child iceberg order was canceled, then the parent iceberg order may be canceled as well. Another recovery condition could confirm that the contract or contracts being traded have not expired.

At block 608, the control routine 600 performs any missed actions. For example, for a time slicer type synthetic orders, the control routine 600 may send an order to the exchange for any scheduled child orders that were not sent to the exchange at their scheduled time when the synthetic order server was down.

Upon completion of the control routine 600, control returns to block 514 illustrated as part of FIG. 5 and the recovery process of control routine 500 completes.

Figure 8:
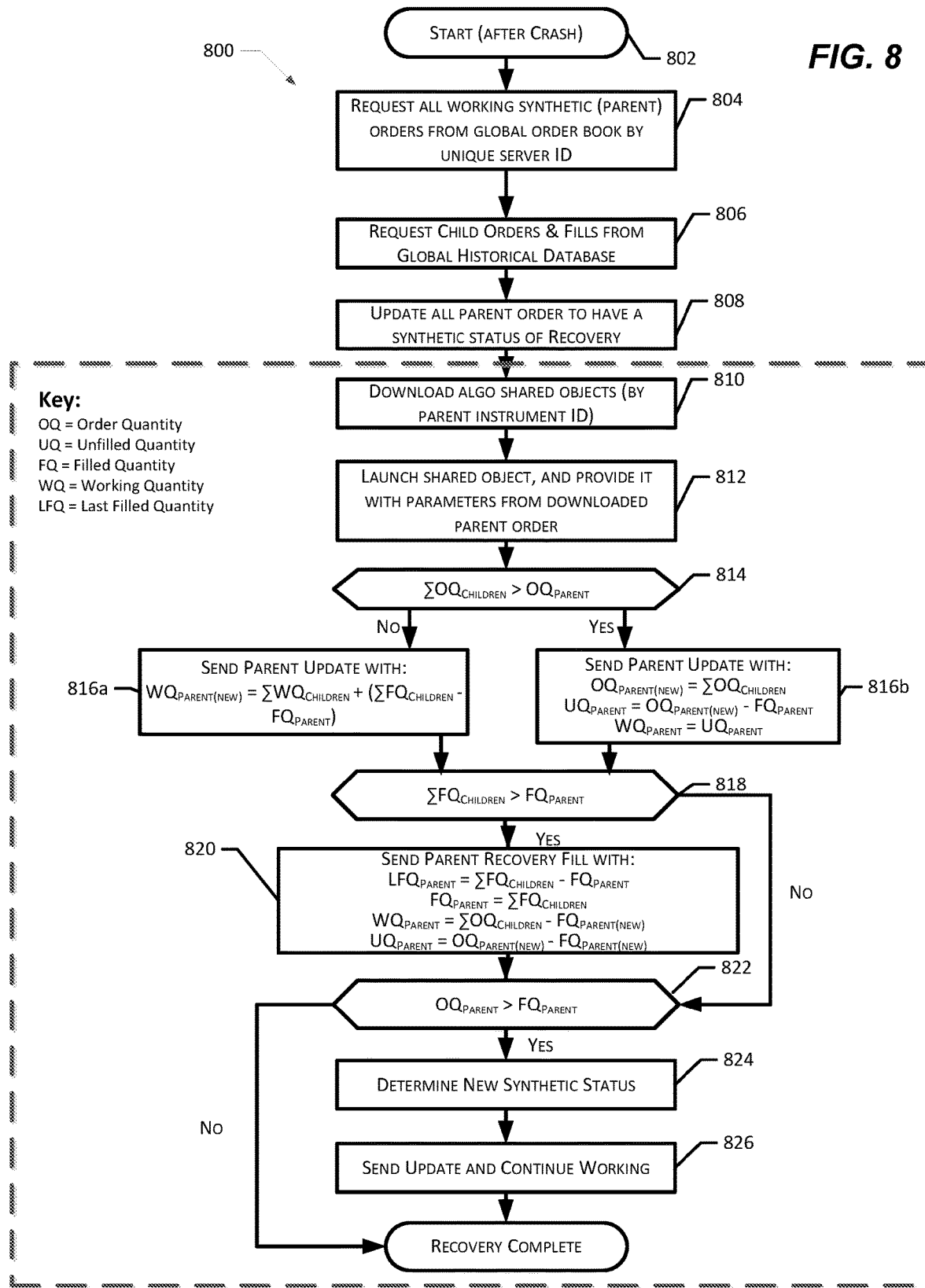
FIG. 8 illustrates a flow diagram of a control routine for an exemplary synthetic order recovery logic component for time slicer type synthetic orders.

FIG. 8 illustrates a control routine 800 that may be implemented as part of the recovery process. The illustrated control routine 800 relates to an exemplary synthetic order recovery logic component. In the present example, the exemplary synthetic order recovery logic component relates to the recovery of time slicer type synthetic orders. In operation, the control routine 800 may be activated and independently from the synthetic order server. For example, upon detection of a server event (e.g., a server maintenance shutdown), the recovery tool 402 operating independently from the synthetic order server 410 shown in FIG. 4 may activate the control routine 800. In this example, the recovery tool 402 may implement the control routine 800 and have the necessary recovery information (i.e., the query results, status information, etc.) prepared and ready when the synthetic order server 410 indicated via a server event that it has restarted and is ready to resume operations. In this instance, the overall recovery time can be reduced by independently preparing the recovery information. In certain embodiment, the recovery tool is a part of the synthetic order server and begins the recovery process when a server event indicating the server has restarted is detected. For example, the recovery tool 402 may be initiated and may implement the recovery process whenever the synthetic order server starts or restarts regardless of what caused the shutdown. In this instance, the overall configuration of the recovery system may be simplified by integrating the recovery tool as a part of the synthetic order server.

At block 802, the control routine 800 starts in response to the receipt or detection of a server event. In certain embodiments, the server event indicates the shutdown of the synthetic order server. For example, the server event could be generated in response to a loss of communications as represented by order message traffic and/or a heartbeat. In certain embodiments, the server event indicates the start or restart of the synthetic order server. For example, when powering up during a start or a restart, the server event could be generated to indicated that communication have been established with the clients 420, the global historical data database 440, the global order book 430, and the resource data server 450.

At block 804, the control routine 800 generates and communicates a query requesting all of the working synthetic orders associated with the synthetic order server. The request returns the parameters such as price, quantity, timing values, disclosed quantity and any other values necessary to define a specific synthetic order type. For example, the recovery tool 402 may utilize the synthetic order server identifier to request all of the working synthetic orders associated with the synthetic order server 410 from the global order book. The synthetic order server identifier may be stored remotely as part of the recovery tool 402 as shown in FIG. 4. In certain embodiments, the synthetic order server identifier may be stored on the synthetic order server 410 itself and access by the recover tool 402 after the restart server event is detected.

At block 806, the control routine 800 generates and communicates a query requesting all of the fills and child orders associated with each synthetic order. For example, the control routine 800 may request the fills and child orders from the global historical database 440 shown in FIG. 4.

At block 808, the control routine 800 updates the status of the synthetic order(s) associated with the synthetic order server identifier to indicate that the synthetic order is being recovered.

The dashed line encompassing blocks 810 to 826 indicates functionality that is repeated for each active synthetic order requested and retrieved at block 806.

At block 810, the control routine retrieves the shared objects such as the synthetic order logic component for each of the synthetic order(s) associated with the synthetic order server identifier. The shared objects for each synthetic order may be determined based on a synthetic order type identifier associated with each order. The synthetic order logic component provides the functionality to implement the synthetic order. The synthetic order logic component may be retrieved from a local file, such as a dynamic link library (DLL) or shared object, for example. In certain embodiments, the synthetic order logic component may be retrieved from a resource data server that stores synthetic order logic components for different order types. In this example, the synthetic order server provides the synthetic order type identifier to the resource data server. The resource data server retrieves and provides the synthetic order logic component associated with the synthetic order type identifier.

At block 812, the control routine 800 launches the retrieved shared objects associated with each of the synthetic orders. In operation, the control routine 800 may execute each of the shared objects sequentially in order to provide it with the parameters associated with each of the retrieved synthetic orders. Alternatively, the control routine 800 may execute each of the shared objects in a parallel or substantially parallel manner.

FIGS. 7A-7D illustrate one example embodiment of a synthetic order and alternate examples of what may have occurred while the server running the synthetic order was unavailable. FIGS. 7A-7D will now be discussed with reference to the exemplary control routine 800 shown in FIG. 8. FIG. 7A is a table including order information for a synthetic order 700 at a point in time before server event is detected and the synthetic order server is restarted.

As shown in FIG. 7A, the first column includes all child orders associated with the synthetic order. The synthetic order itself is also included in the second row. The child orders are shown in the subsequent rows. The second column includes the order quantity ("OQ") for each order. The order quantity includes the total quantity defined for an order. For example, as shown at 710, the second child order has an order quantity of five (5), and the first child order has an order quantity of five (5), as shown at 720, before the synthetic order server is restarted. As shown at 730, the synthetic order has an order quantity of one-hundred (100) before the synthetic order server is restarted. The order quantities of other child orders are also shown in the second column.

As shown in FIG. 7A, the third column includes the filled quantity ("FQ") for each order. The filled quantity is the quantity of an order that has been matched at an exchange. As shown at 722, the first child order has a filled quantity of zero (0), and the synthetic order has a filled quantity of five (5), as shown at 732, before the synthetic order server is restarted. The filled quantities for other child orders are also shown in the third column.

As shown in FIG. 7A, the fourth column includes the working quantity ("WQ") for each order. The working quantity includes the quantity for an order that is pending at the exchange, but not yet been matched. As shown at 712, the second child order has a working quantity of five (5), and the first child order has a working quantity of five (5), as shown at 724, before the synthetic order server is restarted. As shown at 734, the synthetic order has a working quantity of fifteen (15) before the synthetic order server is restarted.

As shown in FIG. 7A, the fifth column includes the unfilled quantity ("UQ") for each order. The unfilled quantity includes the quantity for an order that has not been filled including the working quantity. As shown at 714, the second child order has an unfilled quantity of five (5), and the first child order has an unfilled quantity of five (5), as shown at 726, before the synthetic order server is restarted. As shown at 736, the synthetic order has an unfilled quantity of ninety-five (95) before the synthetic order server is restarted.

FIG. 7B illustrates a table including order information for the synthetic order 700 at a first alternative point in time after the recovery tool has initiated a recovery process in response to the synthetic order server restarting. FIG. 7B illustrates a scenario where there no changes or fills occurred in relation to the child orders of the synthetic order while the synthetic order server was unavailable. The quantities listed in the diagram are the same as in the diagram of FIG. 7A.

FIG. 7C illustrates a table including order information of the synthetic order 700 at a second alternative point in time after the synthetic order server is restarted. In particular, FIG. 7C illustrates the status of the synthetic order 700 and the associated child orders after the control routine 800 has run in response to a detected synthetic order server restart. The order quantity for the second child order, as shown at 710 in FIG. 7A, increased from five (5) to an order quantity of seven (7), as shown at 710C in FIG. 7C. Similarly, the working quantity of the second child order increased from five (5) to working quantity of seven (7), as shown at 712C. Additionally, unfilled quantity of the second child order increased from five (5), as shown at 714 in FIG. 7A, to unfilled quantity of seven (7), as shown at 714C.

FIG. 7D illustrates a table including order information of the synthetic order 700 at a third alternative point in time after the synthetic order server is restarted. In particular, FIG. 7D illustrates the status of the synthetic order 700 and the associated child orders after the control routine 800 has run in response to a detected synthetic order server restart. As shown at 720 of FIG. 7A, the order quantity for the first child order increased from an order quantity of five (5) to an order quantity of one-hundred (100), as shown at 720D of FIG. 7D. The filled quantity for the first child order 722, as shown in FIG. 7A, increased from a filled quantity of zero (0) to a filled quantity of ninety (90), as shown at 722D in FIG. 7D. The working quantity 724 of the first child order increased from five (5) to ten (10), as shown at 724D. The unfilled quantity 726 of the first child order changed from five (5) to ten (10), as shown at 726D.

At block 814, as shown in FIG. 8, the control routine 800 determines that the sum of all child order quantities is greater than the order quantity of synthetic order prior to the recovery process (115 is greater than 100) based Equation 1.

$$\Sigma OQ_{Children} > OQ_{Parent} \qquad \text{(Equation 1)}$$

In particular, the control routine determines whether or not the sum of all child order quantities ($OQ_{Children}$) is greater than the order quantity of the synthetic order ($OQ_{Parent}$).

Updating the quantities of the synthetic order may be performed in a two-step process. At blocks 816a and 816b, the working quantity (WQ), unfilled quantity (UQ), and the order quantity (OQ) of the synthetic order are evaluated. The updated values calculated at blocks 816a and 816b are intermediary values determined before the filled quantity of the synthetic quantity is processed by the control routine 800. After the working quantity, unfilled quantity, and the order quantity of the synthetic order are updated as necessary, the filled quantity of the synthetic order is updated at block 818.

If the sum of all child order quantities ($OQ_{children}$) is not greater than the order quantity of the synthetic order ($OQ_{Parent}$), then at block 816a, as shown in FIG. 8, the control routine 800 sends the synthetic order server an updated synthetic order working quantity based on Equation 2.

$$WQ_{Parent(new)} = \Sigma WQ_{Children} + (\Sigma FQ_{Children} - FQ_{Parent}) \qquad \text{(Equation 2)}$$

The updated synthetic order working quantity ($WQ_{Parent\ (new)}$) may be equal to the sum of all child order working quantities ($WQ_{Children}$) plus the difference between the sum of all child order filled quantities ($FQ_{Children}$) and the synthetic order filled quantity ($FQ_{Parent}$). For example, in relation to the table shown in FIG. 7C, the sum of all child order working quantities is seventeen (17) (5+7+5+0), the sum of all child order filled quantities is five (5) (0+0+0+5), and the synthetic order filled quantity is 732 is five (5). The updated synthetic order working quantity is then 17+(5−5)=17. In practice, the values for $OQ_{Parent(new)}$ and $UQ_{Parent}$ are unchanged and not updated at this point in the control routine 800.

However, if the sum of all child order quantities ($OQ_{Children}$) is greater than the order quantity of the synthetic order ($OQ_{Parent}$), then at block 816b, as shown in FIG. 8, the control routine 800 sends the synthetic order server an updated synthetic order working quantities for each of the active the synthetic orders associated with the synthetic order server according to the Equations 3 to 5.

$$OQ_{Parent(new)} = \Sigma OQ_{Children} \quad \text{(Equation 3)}$$

$$UQ_{Parent} = OQ_{Parent(new)} - FQ_{Parent} \quad \text{(Equation 4)}$$

$$WQ_{Parent} = UQ_{parent} \quad \text{(Equation 5)}$$

For example, the control routine 800 updates the order quantity of the synthetic order ($OQ_{Parent(New)}$) to equal to the sum of order quantity for all child orders ($OQ_{Children}$) according to Equation 3. More specifically, the order quantity ($OQ_{Parent(new)}$) of the synthetic order is updated to "115" (100+5+5+5), as shown at 730D. The control routine 800 updates the synthetic order unfilled quantity ($UQ_{Parent}$) to equal to the newly calculated order quantity of the synthetic order ($OQ_{Children(New)}$) minus the filled quantity of the synthetic order ($FQ_{Parent}$) before the server event was detected (See Equation 4). More specifically, the synthetic order unfilled quantity ($UQ_{Parent}$) is updated "110" (115−5). As indicated in Equation 5, the control routine 800 updates the synthetic order working quantity ($WQ_{Parent}$) to equal to the newly calculated synthetic order unfilled quantity ($UQ_{Parent}$) ("110"). In certain embodiments, the updates determined at blocks 816a and 816b may be stored at the recovery tool 402 to be communicated to the synthetic order server 410 as part of a recovery package.

At block 818, as shown in FIG. 8, the control routine 800 determines that the sum of all child order filled quantities ($FQ_{Children}$) is greater than the synthetic order filled quantity ($FQ_{Parent}$) before the server was restarted. The determination is made according to Equation 6.

$$\Sigma FQ_{Children} > FQ_{Parent} \quad \text{(Equation 6)}$$

If the sum of all child order filled quantities ($FQ_{Children}$) is not greater than the synthetic order filled quantity ($FQ_{Parent}$), then control proceeds to block 822. However, if the sum of all child order filled quantities ($FQ_{Children}$) is greater than the synthetic order filled quantity ($FQ_{Parent}$), control proceeds to block 820.

At block 820, as shown in FIG. 8, the control routine 800 updates the synthetic order server with the synthetic order last filled quantity equal to the sum of all child order filled quantities minus the synthetic order filled quantity before the server was restarted as indicated in Equation 7.

$$LFQ_{Parent} = \Sigma FQ_{Children} - FQ_{Parent} \quad \text{(Equation 7)}$$

$$FQ_{Parent} = \Sigma FQ_{Children} \quad \text{(Equation 8)}$$

$$WQ_{Parent} = \Sigma OQ_{Children} - FQ_{Parent(new)} \quad \text{(Equation 9)}$$

$$UQ_{Parent} = OQ_{Parent(new)} - FQ_{Parent(new)} \quad \text{(Equation 10)}$$

The control routine 800 updates the synthetic order filled quantity that is equal to the sum of all child order filled quantities as indicated in Equation 8. The control routine 800 updates the synthetic order working quantity that is equal to the sum of all order quantities of the child orders minus the newly calculated synthetic order filled quantity as indicated in Equation 9. The control routine 800 updates the synthetic order unfilled quantity that is equal to the difference between the order quantity of the synthetic order and the newly calculated synthetic order filled quantity as indicated in Equation 10. In certain embodiments, the results and updates are stored at the recovery tool 402 as part of the recovery package. The resulting recovery package may be communicated to a synthetic order server in response to receipt of a server event indicating the server has restarted. In certain embodiments, updated quantity and fill information may be provided continuously to any synthetic server that has indicated a restart server event has occurred. In certain embodiments, recovery packets may be generated as a snapshot according to a defined schedule. A recovery delta or difference may further be determined from a detected shutdown server event with respect to the nearest recovery packet snapshot. In certain configurations, the recovery delta may be quickly determined based on cached or otherwise readily available information.

For example, the last filled quantity may be calculated as ninety (90) (95−5) by subtracting synthetic order filled quantity from the sum of all child order filled quantities. The updated synthetic order filled quantity may be calculated as ninety-five (95) (90+5), as shown at 732D, by adding the all the child order filled quantities. The updated synthetic order working quantity may be calculated as twenty (20) (115−95), as shown at 734D, by subtracting the newly calculated synthetic order filled quantity from the sum of all order quantity of the child orders. The updated synthetic order unfilled quantity may be calculated as twenty (20) (115−95), as shown at 736D, by subtracting the new parent synthetic order filled quantity from the new parent order quantity.

At block 822, if the control routine 800 determines that the order quantity ($OQ_{Parent}$) of the synthetic order is not greater than the synthetic order filled quantity ($FQ_{Parent}$) as indicated in Equation 11, then the control routine 800 ends and the recovery tool completes the recovery process.

$$OQ_{Parent} > FQ_{Parent} \quad \text{(Equation 11)}$$

However, if the control routine 800 determines that the order quantity ($OQ_{Parent}$) of the synthetic order is greater than the synthetic order filled quantity ($FQ_{Parent}$), then the control routine 800 proceed to block 824.

At block 824, the control routine 800 determines a new status for each of the synthetic orders being evaluated by the recovery tool. For example, once it is determined that the order quantity ($OQ_{Parent}$) of the synthetic order is greater than the synthetic order filled quantity ($FQ_{Parent}$), the control routine 800 can assign the synthetic order a "working" status. In alternate embodiments, it may be desirable to indicate that the synthetic order has a "recovered" status in place or in addition to the "working" status.

At block 826, the control routine 800 updates the status of the synthetic order to the determined "working" status and continues to process any remaining synthetic orders in serial or substantially parallel manner.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A computer readable medium having stored therein instructions executable by a processor of a server device configured to implement a recovery tool, including instructions executable to:
   establish communication between the server device and a synthetic order server, wherein the server device and the synthetic order server are components of a trading system that communicates with an electronic exchange;
   monitor the status of the synthetic order server;
   detect based on the monitoring of the status of the synthetic order server, a server event associated with the synthetic order server, wherein the synthetic order server has a synthetic order server identifier, wherein the server event identifies that the synthetic order server is unavailable for communications;
   determine, in response to the server event, an active synthetic order being processed by the synthetic order server according to the synthetic order server identifier based on a global order book, wherein the global order book contains all active synthetic orders and any corresponding child orders managed by the trading system, wherein the active synthetic order has one or more child orders, wherein each of the one or more child orders includes a respective child order quantity;
   determine, in response to the server event, a child order status for each child order of the one or more child orders of the active synthetic order based on the global order book, wherein the child order status identifies an updated child order quantity since the server event was detected;
   calculate, in response to the server event, an updated synthetic order quantity for the active synthetic order based on the updated child order quantity;
   generate, in response to the server event, a recovery package including the active synthetic order and the updated synthetic order quantity; and
   communicate, in response to the server event, the recovery package to the synthetic order server associated with the synthetic order server identifier.

2. The computer readable medium of claim 1, wherein determining the active synthetic order includes identifying an order type for the active synthetic order.

3. The computer readable medium of claim 2, further including instructions executable to:
   identify at least one order logic component for each order type associated with the active synthetic order.

4. The computer readable medium of claim 3, further including instructions executable to: retrieve the identified at least one order logic component from a resource data server.

5. The computer readable medium of claim 1, wherein the recovery package further includes an updated synthetic order status.

6. The computer readable medium of claim 1, wherein the server event corresponds to a loss of communication between the server device and the synthetic order server.

7. The computer readable medium of claim 1, wherein the server event is received from the synthetic order server to indicate a server restart.

8. The computer readable medium of claim 1, wherein communicating the recovery package to the synthetic order server includes communicating the recovery package to the synthetic order server in response to a second server event.

9. The computer readable medium of claim 1, wherein the synthetic order server includes the server device.

10. A system including:
    a server device configured to implement a recovery tool, wherein the server device is configured to establish communication between the server device and a synthetic order server, wherein the server device and the synthetic order server are components of a trading system that communicates with an electronic exchange;
    wherein the server device is configured to monitor the status of the synthetic order server;
    wherein the server device is configured to detect based on the monitoring of the status of the synthetic order server, a server event associated with the synthetic order server, wherein the synthetic order server has a synthetic order server identifier, wherein the server event identifies that the synthetic order server is unavailable for communications;
    wherein the server device is configured to determine, in response to the server event, an active synthetic order being processed by the synthetic order server according to the synthetic order server identifier based on a global order book, wherein the global order book contains all active synthetic orders and any corresponding child orders managed by the trading system, wherein the active synthetic order has one or more child orders, wherein each of the one or more child orders includes a respective child order quantity;

wherein the server device is configured to determine, in response to the server event, a child order status for each child order of the one or more child orders of the active synthetic order based on the global orderbook, wherein the child order status identifies an updated child order quantity since the server event was detected;

wherein the server device is configured to calculate, in response to the server event, an updated synthetic order quantity for the active synthetic order based on the updated child order quantity;

wherein the server device is configured to generate, in response to the server event, a recovery package including the active synthetic order and the updated synthetic order quantity; and wherein the server device is configured to communicate, in response to the server event, the recovery package to the synthetic order server associated with the synthetic order server identifier.

11. The system of claim 10, wherein determining the active synthetic order includes identifying an order type for the active synthetic order.

12. The system of claim 11, wherein the server device is configured to identify at least one order logic component for each order type associated with the active synthetic order.

13. The system of claim 12, wherein the server device is configured to retrieve the identified at least one order logic component from a resource data server.

14. The system of claim 10, wherein the recovery package further includes an updated synthetic order status.

15. The system of claim 10, wherein the server event corresponds to a loss of communication between the server device and the synthetic order server.

16. The system of claim 10, wherein the server event is received from the synthetic order server to indicate a server restart.

17. The system of claim 10, wherein communicating the recovery package to the synthetic order server includes communicating the recovery package to the synthetic order server in response to a second server event.

18. The system of claim 10, wherein the synthetic order server includes the server device.

* * * * *